United States Patent [19]
Labbe

[11] Patent Number: 5,508,526
[45] Date of Patent: Apr. 16, 1996

[54] DUAL ENTRANCE WINDOW ION CHAMBER FOR MEASURING X-RAY EXPOSURE

[75] Inventor: Michael S. Labbe, Twinsburg, Ohio

[73] Assignee: Keithley Instruments, Inc., Solon, Ohio

[21] Appl. No.: 382,138

[22] Filed: Feb. 1, 1995

[51] Int. Cl.$^6$ .................................................. G01T 1/185
[52] U.S. Cl. .......................... 250/374; 378/37; 378/161
[58] Field of Search .............................. 250/374; 378/37, 378/116, 161

[56] References Cited

U.S. PATENT DOCUMENTS

| | | | |
|---|---|---|---|
| 3,296,478 | 1/1967 | Ichinorawa | 378/161 |
| 4,230,944 | 10/1980 | Wiegman et al. | 378/116 |
| 4,896,041 | 1/1990 | Vlasbloem et al. | 250/374 |
| 5,115,134 | 5/1992 | Slowey | 250/374 |

Primary Examiner—Carolyn E. Fields
Attorney, Agent, or Firm—Tarolli, Sundheim, Covell, Tummino & Szabo

[57] ABSTRACT

A dual entrance window ion chamber is provided for purposes of measuring x-ray exposure. The ion chamber includes a housing having a cavity formed therein and which defines an ion chamber. The housing has oppositely disposed first and second openings therein located on opposite sides of the chamber. First and second x-ray entrance windows respectively cover the first and second openings for permitting entrance of x-rays into the chamber. A collector is located in the chamber intermediate the first and second windows for collection of electrons for use in measuring x-ray exposure. The first and second windows are constructed differently from each other such that the first window is optimized so that the ion chamber provides a relatively flat energy response to x-rays over a first x-ray energy range. The second window is optimized so that the ion chamber provides a relatively flat energy response over a second x-ray energy range. The second energy range is of a greater energy level than that of the first energy range.

12 Claims, 2 Drawing Sheets

DUAL ENTRANCE WINDOW ION CHAMBER FOR MEASURING X-RAY EXPOSURE

TECHNICAL FIELD

The present invention is directed to the art of ion chambers and, more particularly, to an improved ion chamber having two x-ray entrance windows each for permitting entrance of x-rays into the chamber. The windows are constructed differently from each other so that one window is optimized so that the ion chamber provides a relatively flat energy response to x-ray energy exposures over a first x-ray energy range and the other window is optimized so that the ion chamber provides a relatively flat energy response over a second, higher x-ray energy range.

BACKGROUND OF THE INVENTION

X-rays are used extensively in medicine, for both diagnostic and interventional purposes. Since x-ray radiation is potentially harmful to human tissue, it is necessary to accurately measure the amount of radiation to which a person is exposed. Too much radiation can permanently damage human tissue, while too little radiation may not allow the proper diagnosis and treatment of injury or disease.

X-rays interact with matter such as to produce secondary electrons, which are free electrons with large kinetic energy. The secondary electrons then create many more ions (electrically charged particles) as they travel and give up their energy. The ratio of the ionizations created by a secondary electron to a single ionization created by an x-ray photon is about 10,000 to 1. This is why x-rays are called indirectly ionizing radiation. Exposure is a measure of the ability of the x-ray radiation to ionize air. A commonly used unit of x-ray exposure is the roentgen. One roentgen is defined as the amount of radiation that will produce a charge of 3.336E-10 Coulombs in 1 cubic centimeter of dry air at 0° C. and an atmospheric pressure of 760 millimeters of mercury.

It is known in the art that certain ion chambers, known as free air ion chambers, are used by standards laboratories and the like for measuring exposure. However, since free air ion chambers are bulky and relatively immobile, they are not suited for measuring x-ray generators in different locations. Instead, a compact and portable practical ion chamber is needed. Although these practical ion chambers come in a variety of shapes and sizes, the general concept is that a volume of air is contained within a cavity of solid material. A common variety of practical ion chambers is a flat parallel plate ion chamber. In this design, the charged plates which collect ions remain parallel to each other, as in a free air ion chamber. However, the plates are placed fairly close together, and the air volume between the plates in enclosed by solid walls.

For all of these enclosed volume chambers, the x-ray photons must first pass through a solid material (not air) before reaching the active air volume inside. The piece of solid material that the x-ray photons pass through is often called the entrance window of the chamber. As x-ray photons pass through this solid entrance window material, they produce secondary electrons. Many of these secondary electrons will travel into the active air volume. These electrons will, in turn, produce many more ions, which will be collected by the charged plates of the ion chamber. Since the definition of x-ray exposure involved ionizations produced when x-ray photons passed only through air (and ionization parameters are dependent on the material in which they occur), a direct measure of exposure cannot be determined using this type of chamber. Instead, this chamber must be calibrated by directly or indirectly comparing it to a free air ionization chamber. The practical and free air ion chambers are placed in the same x-ray field. The calibration factor for the practical ion chamber is then calculated by dividing the exposure measured with the free air chamber by the charge collected in the practical ion chamber. This practical ion chamber may then be used to measure the exposure of other x-ray beams by multiplying the charge collected in the ion chamber by the calibration factor.

For general medical x-ray procedures, there are two basic categories of x-ray beam qualities that must be measured by an ion chamber. These two categories are generally called diagnostic and mammography beam qualities. In mammography procedures, the kVp range of interest is about 20 to 50 kVp with very little added external filtration. Diagnostic procedures are normally defined from about 50 to 150 kVp with significantly more filtration in the beam. In addition, the anode material used to generate the x-ray spectrum is different (tungsten for diagnostic and usually molybdenum for mammography) which also causes differences in the x-ray spectra, and therefore the response of the ion chamber.

The entrance window must be thick enough to achieve electronic equilibrium, but thin enough so that attenuation is not a significant factor. Since the required window thickness is energy dependent, the desired thickness of an entrance window for mammography measurements may be different than that for diagnostic measurements. In the prior art, ion chambers only have one unique entrance window. Therefore, a choice must be made whether to optimize the entrance window thickness for mammography or diagnostic response.

Additionally, an entrance window that does not have an effective atomic number equivalent to that of air will result in an energy dependent ion chamber response. By adjusting the effective atomic number (a small thin piece of Al (atomic number=13) can be attached to the inside of the entrance window to increase the effective atomic number), an ion chamber energy response can be improved. However, one will likely never achieve a completely air equivalent window using the mixture of different materials (Plastic window, carbon coating, Al foil) that generally comprise entrance windows. Therefore, one must again choose an energy range over which to optimize the energy response. The amount of Al that must be added to optimize the diagnostic energy response is not necessarily the amount needed to optimize the energy response over the mammography energy range.

As a result, in the current state of the art of ion chambers, an ion chamber with an entrance window optimized for mammography energy response and with an effective atomic number optimized for mammography response has a relatively poor diagnostic response. Conversely, an ion chamber optimized for diagnostic response has relatively poor mammography response.

One example of an ion chamber that has been optimized for mammography energy response, as discussed above, is presented in the U.S. Pat. to T. W. Slowey 5,115,134. As in the discussion presented above, this ion chamber has a single entrance window optimized for mammography response. This ion chamber provides a relatively flat energy response to x-rays over the mammography x-ray energy range of from approximately 20 kVp to 50 kVp. The U.S. Pat. No. to H. Vlasbloem et al. 4,896,041 also discloses an ion chamber for medical use. This ion chamber employs two entrance windows which are of identical construction. That is, each window is optimized for the same x-ray energy range. No indication is presented that the windows might be constructed differently for use with different energy ranges.

Ion chamber manufacturers have solved this problem by selling two ion chambers, one optimized for diagnostic measurements and one optimized for mammography measurements. The mammography chamber will often have a much thinner window than the diagnostic chamber. Other manufacturers simply optimize the chamber for one of the two ranges, and accept a less than optimal energy response in the other range. This can result in significant inaccuracies for all measurements made in the poor energy response range.

SUMMARY OF THE PRESENT INVENTION

The present invention is directed toward overcoming the problems noted above relative to existing ion chambers.

It is an object to provide an improved ion chamber that has a flat energy response for different energy ranges such as that for mammography and for diagnostic x-ray beams.

It is still a further object to provide such an ion chamber having two different entrance windows for x-rays.

It is still a further object to provide such an ion chamber as described above wherein one of the entrance windows results in optimized energy response for diagnostic x-ray beam qualities while the other entrance window results in optimized energy response for mammography x-ray beam qualities.

In accordance with the present invention, there is provided a dual entrance window ion chamber for measuring x-ray exposure. This includes a housing having a cavity therein defining an ion chamber with the housing having oppositely disposed first and second openings located on opposite sides of the chamber. First and second x-ray entrance windows respectively cover the first and second openings for permitting entrance of x-rays into the chamber. A collector is located in the chamber intermediate the first and second windows for collection of ions for use in measuring x-ray exposure. The first and second windows are constructed differently from each other. The first window is optimized so that the ion chamber provides a relatively flat energy response to x-rays over a first x-ray energy range. The second window is optimized so that the ion chamber provides a relatively flat energy response over a second x-ray energy range, wherein the second energy range is of a greater energy level than that of the first energy range.

In accordance with a more limited aspect of the present invention, the first x-ray energy range is from about 20 kVp to about 50 kVp for use with mammography x-ray beams and the second x-ray energy range is from about 50 kVp to about 150 kVp and which corresponds with the diagnostic x-ray range.

BRIEF DESCRIPTION OF THE DRAWINGS

The foregoing and other objects and advantages of the invention will become more readily apparent to those skilled in the art when taken in light of the drawings herein which are a part hereof and wherein.

DESCRIPTION OF THE PREFERRED EMBODIMENT

Reference is now made to the drawings wherein the showings are for purposes of illustrating a preferred embodiment of the invention only and not for purposes of limiting same.

Figure 1:
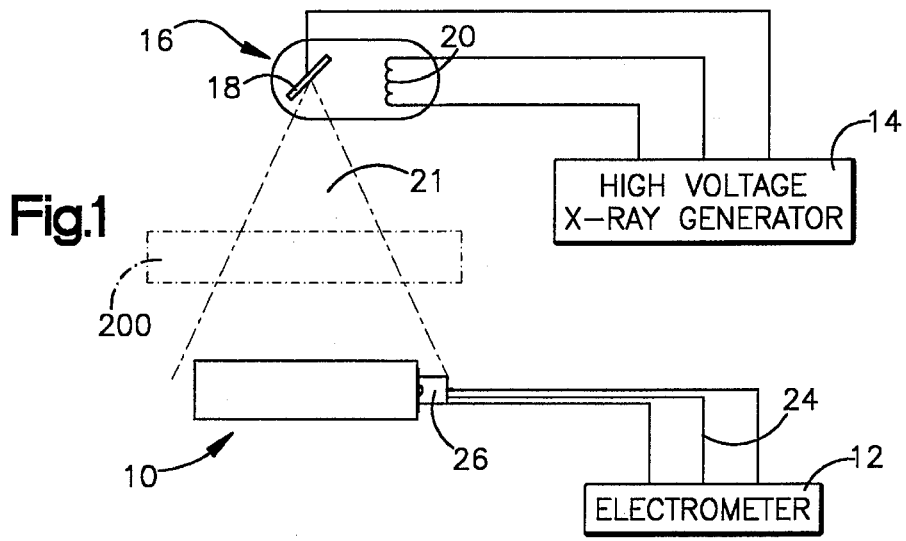
FIG. 1 is a schematic-block diagram illustration of one application to which the present invention may be applied.

Before describing the details of the ion chamber constructed in accordance with the invention, reference is first made to the application of the invention as depicted in FIG. 1. This application relates to the use of an ion chamber 10, constructed in accordance with the invention, together with an electrometer 12 for measuring radiation exposure from a radiation source such as a high voltage x-ray generator 14 and x-ray tube 16. The generator 14 is illustrated as being connected to an x-ray tube 16 having an anode 18 and a cathode 20. The x-ray generator 14 is provided with means for supplying a variable kilovoltage to the x-ray tube over a range such as on the order from 20 kV to 150 kV to provide an x-ray beam 21.

It is important to determine the exposure value of radiation being produced. A specific unit of such exposure, as discussed hereinabove, is frequently referred to as a roentgen. In the application being presented in FIG. 1 an ion chamber 10 and an electrometer 12 are employed for measuring radiation exposure. As will be brought out herein, the ion chamber collects the ions created as the x-ray photons pass through the entrance window and active air volume of the chamber. The electrometer 12 is used to measure the electrical charge collected by the ion chamber 10 and generates a reading of the number of coulombs of charge accumulated from the ionized air in the ion chamber 10.

As will be described in greater detail hereinafter with reference to FIGS. 2 and 3, the x-ray beam strikes the ion chamber 10 and passes through an entrance window into an inner cavity within the chamber. The chamber contains an ion collection electrode sometimes referred to as a collector. The ionizing radiation that enters the chamber causes some of the air molecules to separate into electrically charged ions. An electrical field is established by a relatively high DC voltage of, for example, 300 volts connected between the collector plate and the interior walls of the chamber. Any ions that form within the chamber will be attracted to the plate of the opposite polarity before they can recombine. Instead, they strike the plates and cause a current to flow to the electrometer. The ion collector 100 is connected to a central signal conductor 24 in a triaxial cable connector 26. As best shown in FIG. 3, the central signal conductor 24 is coaxially surrounded by a guard shield 28. The guard shield 28 is, in turn, coaxially surrounded by an outer shield 30 which is electrically connected to the outer wall of the ion chamber 10 and to the negative grounded side of a voltage source 32.

The electrometer 12 is illustrated in greater detail in FIG. 3 and includes an operational amplifier 40 having its negative or inverting input connected to the central signal conductor 24 of the triaxial cable connector 26 and its positive or non-inverting input connected to the positive side of the voltage source 32, as well as, to the guard shield 28 of the triaxial cable connector 26. A voltmeter 42 provides a readout of the amount of charge collected in the chamber. An integrating capacitor 44 is connected between the negative input and the output of the amplifier 40 and a reset switch 46 is connected across the integrating capacitor.

As charge accumulates on the collector 100 inside the ion chamber 10, current will flow into the negative input node of amplifier 40 of the electrometer 12. The output of the voltmeter 42 is thus representative of a measure of the number of coulombs of charge accumulated from the air in the ion chamber 10.

Having briefly described the application of ion chamber 10, attention is now directed toward a discussion of the improved ion chamber in accordance with the present invention with reference to FIGS. 2–6.

Figure 2:
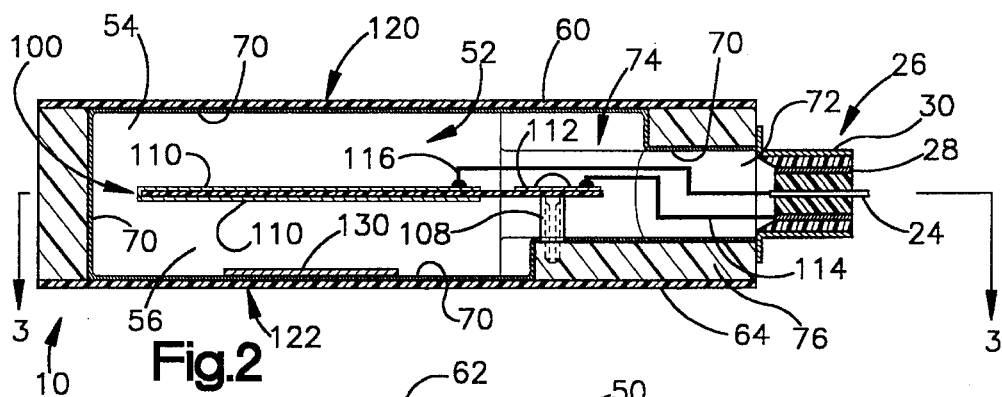
FIG. 2 is an elevational view shown partly in section of an ion chamber constructed in accordance with the present invention.
Figure 3:
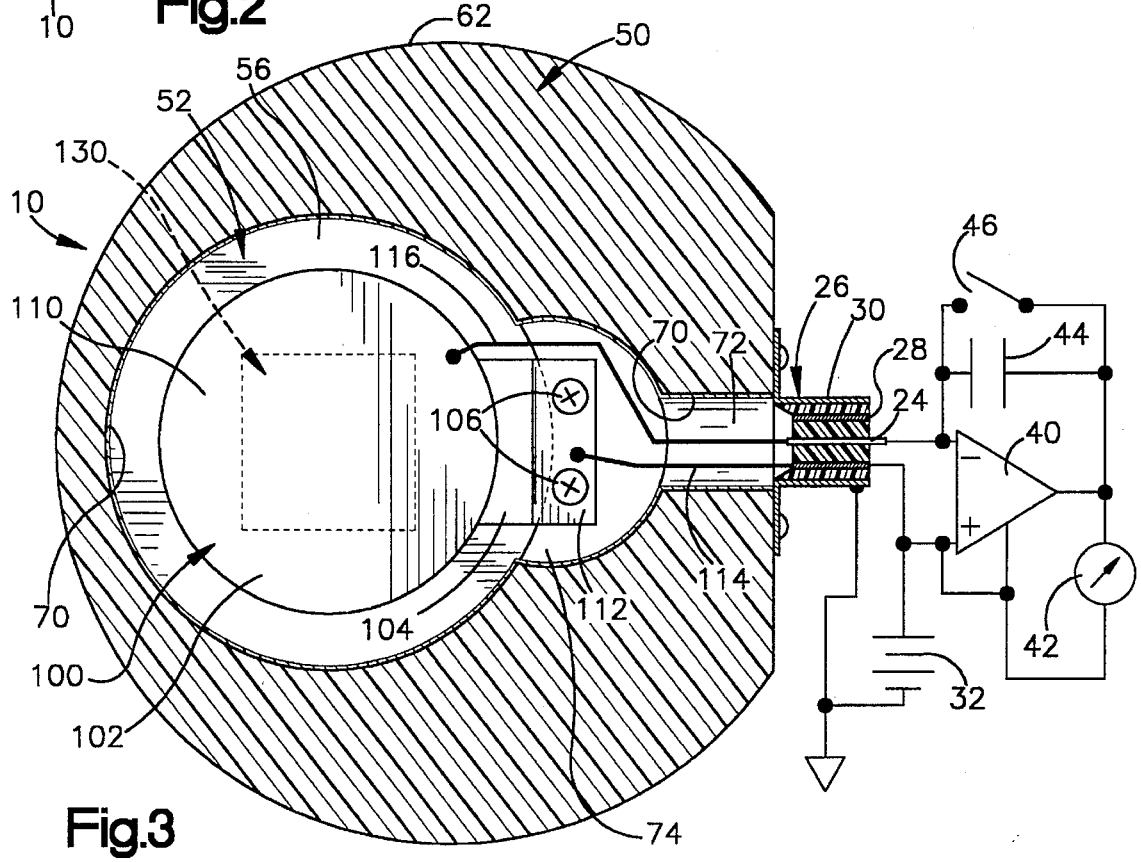
FIG. 3 is a view taken along line 3—3 looking in the direction of the arrows in FIG. 2 together with a schematic-block diagram illustration of an electrometer for use with the ion chamber.

Reference is now made specifically to FIGS. 2 and 3 which illustrate the dual entrance window ion chamber 10 constructed in accordance with the present invention. The ion chamber 10 takes the form of a relatively flat disk-shaped housing 50 which is a solid block of non-conductive material, such as plexiglass. This housing has a circular-shaped cavity 52 defined therein. This cavity 52 extends through the housing 50 from the top to bottom, as viewed in FIG. 2 so as to provide a first or upper circular opening 54 and a second or lower circular opening 56. The openings 54 and 56 are registered with each other. The first or upper opening 54 is covered with a cover 60, constructed of non-conductive material, such as Lexan. This cover 60 is constructed so that its outer periphery corresponds with the outer periphery 62 of the housing 50, as viewed in FIG. 3.

The lower or second opening 56 is covered by a cover 64 which corresponds in shape with that of cover 60. A suitable adhesive is applied to the inner surfaces of covers 60 and 64 so as to adhere to the upper and lower surfaces of housing 50, where these surfaces surround the periphery of the cavity 52.

The inner surface of covers 60 and 64 and the inner walls of the housing 50 that define the cavity 52 are all coated with a conductive carbon layer 70. This layer 70 serves as an outer electrode that surrounds collector 100 located within the cavity. This layer 70 makes electrical contact with the outer shield 30 of the triaxial cable connector 26. More specifically, a passageway 72 extends through one end of the housing 50 into a partial cavity 74 that directly communicates with cavity 52. This partial cavity 74 has its interior walls coated with the carbon layer 70. Moreover, the passageway 72 has its interior walls coated with the carbon layer 70 so that this coating extends to the triaxial cable connector 26 to make electrical contact with shield 30.

It is to be noted that the partial cavity 74 is formed in the housing 50 by means of a somewhat semicircular cutout portion leaving a shelf 76, which, as will be described in greater detail below, serves to support the collector 100 located within the cavity 52.

An ion collector 100 is located in the cavity 52 midway between the upper cover 60 and the lower cover 64. As best seen in FIG. 3, this is a flat circular disk-shaped member 102 having an extension flange 104 which extends into the partial cavity 74 and rests on shelf 76 and is secured thereto by means of suitable screws 106. The screws 106 extend through a suitable insulator 108 so as to prevent an electrical short between the conductive layer on the guard region 112 and the layer 70 on the inner walls of the cavity 74.

The disk-shaped member 102 is coated with a carbon layer 110. Spaced from the carbon layer 110 on the collector 100 toward the partial cavity 74 there is provided a coating 112 forming a rectangular portion on the extension flange 104. This serves as a guard region and is electrically connected to guard shield 28 by means of a suitable wire 114. The carbon coating 110 on collector 100 is electrically connected to the central or signal conductor 24 by means of an electrical conductor 116. It is to be noted that the effective area of the collector 100 corresponds with the disk-shaped member 102 and this disk, which is circular in shape, is centered within the cavity 52 so that the inner periphery of the cavity coaxially surrounds the outer periphery of the disk.

The upper cover 60 and the lower cover 64 respectively include a first or upper window 120 and a second or lower window 122. Each window is circular shaped and has an effective area corresponding with that of the openings 54 and 56. The windows are identical in construction and in dimension with the exception of an aluminum patch 130 located on the inner surface of the window 122. The aluminum patch 130 is square shaped and relatively thin, on the order of 0.0025 cm thick. The height and width of the patch 130 may be each on the order of 1.5 cm. This patch 130 is centrally mounted within the confines of the window 122 and is secured to the inner conductive layer 70 on the window by means of a suitable electrically conductive adhesive. As will be brought out, this patch 130 is provided for optimizing window 122 for use with x-ray beam qualities in the diagnostic range.

Window 120 is optimized for mammography and window 122 is optimized for diagnostic x-ray energy ranges. The tailoring of windows so as to be optimized for a particular x-ray energy range has been known in the art. The entrance window 122 must be thick enough to achieve electronic equilibrium, but thin enough so that attenuation is not a significant factor. Consequently, the entrance windows may be of different thickness for different energy ranges. Window 120 is constructed so that its thickness is optimized for mammography response. Window 122 may be constructed of a thicker material or with a different material other than Lexan. It has been determined that the entrance window 122 may be constructed of the same material and the same thickness of entrance window 120 but have different characteristics by adding a thin piece of metal, preferably aluminum. By adding a thin piece of metal such as aluminum having an atomic number of 13, the effective atomic number of the entrance window 122 can be increased. Consequently, the ion chamber energy response is improved for diagnostic beam qualities. This aluminum patch 130 makes the diagnostic entrance window 122 more air equivalent to provide a flatter energy response over the x-ray energy range of interest, from approximately 50 kVp to approximately 150 kVp. This patch 130 is electrically connected to the carbon layer 70 on the inside surface of the window 122.

The entrance windows 120 and 122 are on opposite sides of the ion chamber. When making diagnostic exposure measurements, the diagnostic window 122 is turned toward x-ray tube 16 (FIG. 1). The patch 130 attached to the backside of the diagnostic entrance window 122 provides an optimally flat energy response for diagnostic exposure measurements.

When the ion chamber is turned upside down, the mammography entrance window 120 (as is shown in FIG. 2) will face the x-ray tube 16. This is the configuration used for all mammography exposure measurements. Since this window does not have a patch, such as, patch 130 attached to the backside of the window 122, the ion chamber has a different energy response which has been optimized for mammography exposure measurements. Consequently, this structure provides a single ion chamber having a dual energy range characteristic. It is optimized for energy response for both the diagnostic and mammography x-ray ranges.

Figure 4:
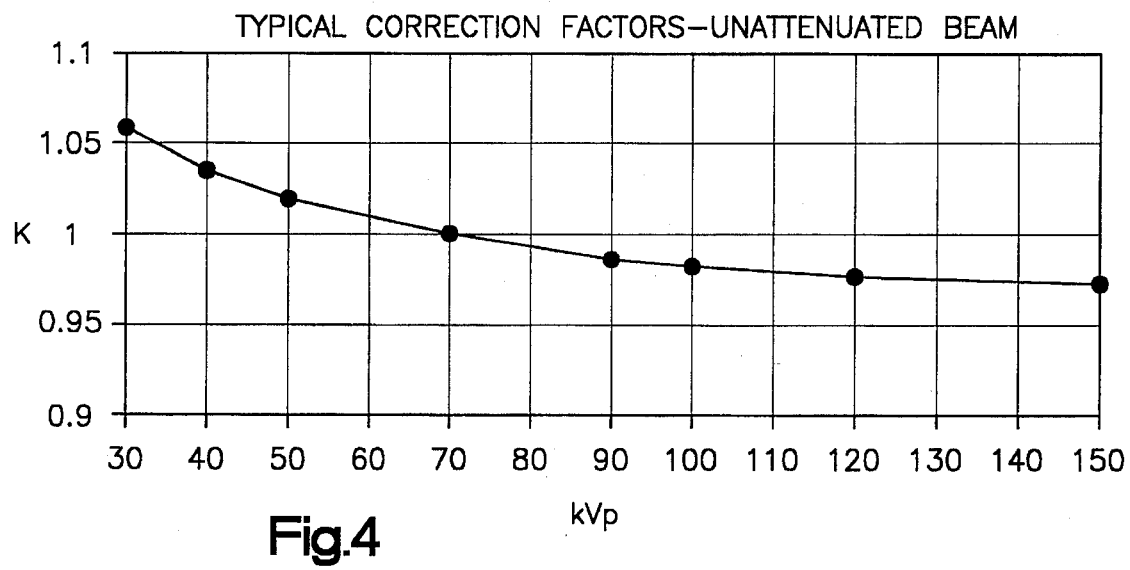
FIG. 4 is a correction curve illustrating corrections to be made for various kVp readings over a range from 30 kvp to 150 kVp.
Figure 5:
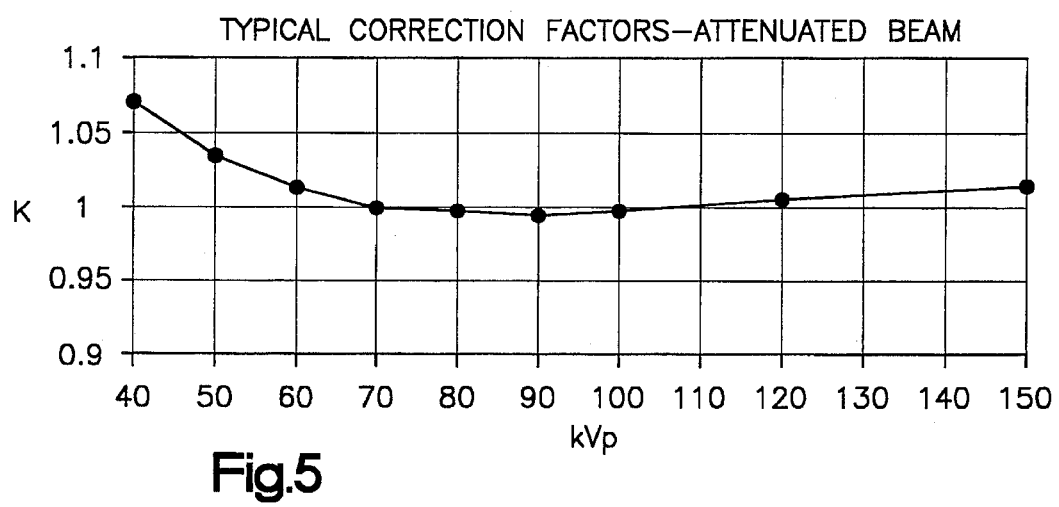
FIG. 5 is a correction curve illustrating corrections to be made for various kVp readings over a range from 40 kVp to 150 kVp; and, FIG. 6 is a correction curve illustrating corrections to be made for various kVp readings over a range from 20 kVp to 50 kVp.
Figure 6:
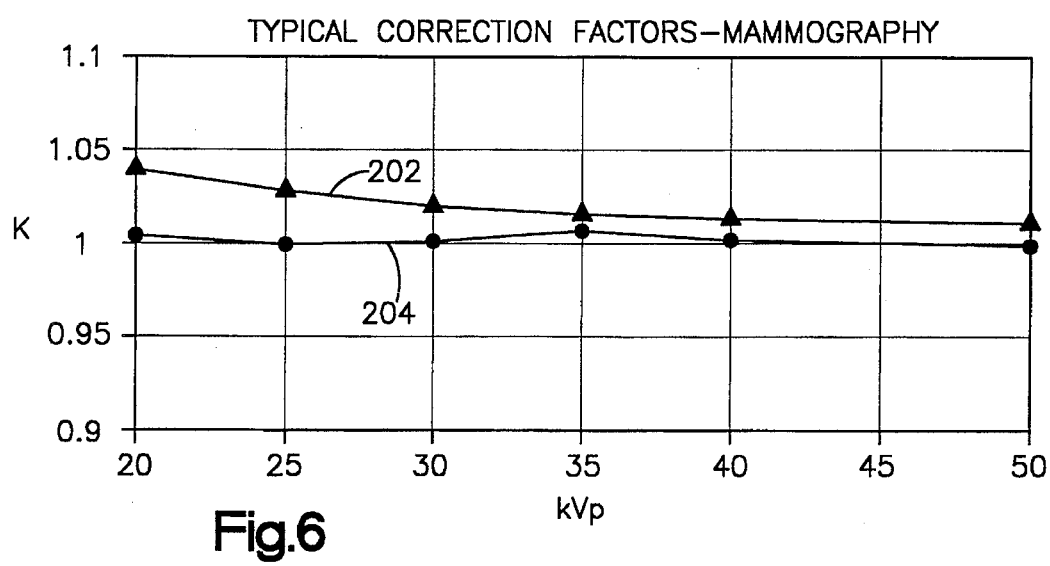

Reference is now made to the curves or plots shown in FIGS. 4, 5 and 6 together with Tables 1, 2, 3 and 4, herein. The plots in FIGS. 4, 5 and 6 show correction factors K plotted against kVp. In this discussion, reference is made to the existence or non-existence of a patient phantom. This refers to the phantom 200 shown in FIG. 1. A phantom, as is known in the art, simulates a patient and may take the form of a layer of metal, such as aluminum. An unattenuated x-ray beam refers to a beam without the phantom being present and an attenuated beam refers to a measurement taken with a phantom being present.

The plots of FIGS. 4, 5 and 6 demonstrate the energy response of the dual entrance window ion chamber. The plots are given over four different beam quality ranges. A beam quality relates to the spectrum of a given x-ray beam, and is usually described by giving the kVp and first HVL of the beam. HVL means half value layer. The HVL of a beam is defined as the thickness of material (usually Al) which is necessary to decrease the x-ray intensity by one half. The four beam quality ranges of interest are: diagnostic in front of the phantom (FIG. 4), diagnostic behind the phantom (FIG. 5), mammographic in front of the phantom (FIG. 6) and mammographic behind the phantom (FIG. 6). To obtain the energy response for both diagnostic sets of beam qualities, the diagnostic entrance window faces 122 the x-ray tube. For the mammographic beam qualities, the chamber is reversed such that the mammographic entrance window 120 faces the x-ray tube. As will be seen from the plots below, this dual entrance window configuration provides excellent energy response for both diagnostic and mammography conditions using a single ion chamber.

Diagnostic—Unattenuated Beam (in front of the phantom)

The beam qualities in Table 1, defined by PTB in Germany, are used to measure the energy response of the ion chamber for the unattenuated diagnostic beam. For each beam quality, the kVp, total filtration in the beam, and the first HVL in mm Al are given.

TABLE 1

| Denomination | kVp | Total effective filtration in mm Al | First HVL in mm AL |
| --- | --- | --- | --- |
| DV30 | 30 | 2.5 | 1.046 |
| DV40 | 40 | 2.5 | 1.42 |
| DV50 | 50 | 2.5 | 1.82 |
| DV70 | 70 | 2.5 | 2.45 |
| DV90 | 90 | 2.5 | 3.10 |
| DV100 | 100 | 2.5 | 3.60 |
| DV120 | 120 | 2.5 | 4.30 |
| DV150 | 150 | 2.5 | 5.40 |

Energy response is usually plotted by comparing the calibration factor at each beam quality to a chosen reference value. In this case, the beam quality DV70 in Table 1 is selected as the reference value. To obtain an energy response curve, the calibration factor at each beam quality is divided by the calibration factor at beam quality DV70, and the results are plotted vs. kVp. By definition, the value of the plot at 70 kVp will be one. The chamber is said to have a good energy response if the plot is relatively flat, with all values as close to one as possible. The values plotted in FIG. 4 are often called correction factors, since they are the values that would be used to correct measurements made at any of these beam qualities using an ion chamber calibrated only at DV70. Proposed international standards require that for kVp values between 50 and 150, all correction factors must be between 0.95 and 1.05. FIG. 4 shows the energy response of the dual entrance window chamber for these beam qualities.

Diagnostic—Attenuated Beam (behind the phantom)

The energy response of the ion chamber behind the phantom is determined for beam qualities defined in Table 2. For this case, DN70 is used as the reference beam quality. Dividing the calibration factor at each beam quality by the calibration factor at the reference value again gives typical correction factors which are plotted versus kVp for the chamber in FIG. 5. The proposed international standards require that for kVp values between 50 and 150, the correction factors must be between 0.95 and 1.05.

TABLE 2

| Denomination | kVp | Total effective filtration in mm Al | First HVL in mm AL |
| --- | --- | --- | --- |
| DN40 | 40 | 6.5 | 2.15 |
| DN50 | 50 | 12.5 | 3.4 |
| DN60 | 60 | 18.5 | 5.0 |
| DN70 | 70 | 23.5 | 6.2 |
| DN80 | 80 | 29.5 | 7.8 |
| DN90 | 90 | 32.5 | 9.0 |
| DN100 | 100 | 36.5 | 10.1 |
| DN120 | 120 | 42.5 | 12.0 |
| DN150 | 150 | 52.5 | 14.1 |

Mammography The beam qualities defined by PTB for mammography in front of the phantom are given in the Table 3. The total filtration in this case is given in terms of thickness of molybdenum, and the first HVL is given in mm Al.

TABLE 3

| Denomination | kVp | Total effective filtration in mm Al | First HVL in mm AL |
| --- | --- | --- | --- |
| MV20 | 20 | 30 μm Mo | 0.223 |
| MV25 | 25 | 30 μm Mo | 0.282 |
| MV30 | 30 | 30 μm Mo | 0.337 |
| MV35 | 35 | 30 μm Mo | 0.374 |
| MV40 | 40 | 30 μm Mo | 0.402 |
| MV50 | 50 | 30 μm Mo | 0.440 |

The PTB defined beam qualities for mammography behind the phantom are given in Table 4.

TABLE 4

| Denomination | kVp | Total effective filtration | First HVL in mm AL |
| --- | --- | --- | --- |
| MH20 | 20 | 30 μm Mo + 2.0 mm Al | 0.45 |
| MH25 | 25 | 30 μm Mo + 2.0 mm Al | 0.58 |
| MH30 | 30 | 30 μm Mo + 2.0 mm Al | 0.67 |
| MH35 | 35 | 30 μm Mo + 2.0 mm Al | 0.75 |
| MH40 | 40 | 30 μm Mo + 2.0 mm Al | 0.83 |
| MH50 | 50 | 30 μm Mo + 2.0 mm Al | 0.97 |

For mammography, a single beam quality is used as a reference value for measurements both in front of and behind the phantom. MH30 is used as the reference beam quality for the mammographic range. Since only a single reference is used, the energy response for both sets of beam qualities are plotted on the same graph. Calibration factor data collected on the chamber was taken with the mammography entrance window facing the x-ray tube. Each calibration factor is divided by the calibration factor at MH30 and plotted vs. kVp in FIG. 6. Curve 202 is for the unattenuated beam whereas curve 204 is for the attenuated beam. Proposed international specifications require that the correction factors be between 0.95 and 1.05 for kVp values between 25 and 40. As can be seen from the graph, the dual entrance window chamber meets this requirement for all beam qualities from 20 to 50 kVp.

A dual window ion chamber has been constructed in accordance with the invention and specifically, in accordance with FIGS. 2 and 3 herein. Some of the specifications of the ion chamber constructed are presented below. This is a vented volume, parallel-plate air ionization chamber. Diagnostic measurements are made using one side of the chamber as the entrance window and mammographic measurements are made using the other side as the entrance window. The chamber is constructed as somewhat flat, as shown in FIG. 2, and has a diameter on the order of 6.35 cm and is of a thickness or height, as viewed in FIG. 2 of approximately 1.30 cm. The entrance windows are graphite coated polycarbonate (Lexan) and are each of a thickness of approximately 0.025 cm. The aluminum patch 130 on the diagnostic window 122 is approximately 1.5 by 1.6 cm and is of a thickness on the order of 0.0025 cm. The window thickness is in the order 0.032 g/cm$^2$. The upper window 120 and the lower window 122 are circular corresponding essentially with the diameter of cavity 52 and are centered 0.71 cm further from the triaxial cable connector 26 than the center of the chamber body. The active window regions each have an area on the order of 12.3 cm$^2$. The reference point is located 0.65 cm directly below the center of the active window region of either window. This corresponds to the center of the active volume. The collector is a 0.025 cm thick, centrally mounted, graphite coated polycarbonate (Lexan) plate. The diameter of the collector is on the order of 3.18 cm. A guard region 112 having dimensions on the order of 1.27 cm×0.89 cm is electrically isolated from the collector area.

The ion chamber has an energy range in the order of 30 to 150 kVp for diagnostic measurements and 20 to 50 kVp for mammographic measurements.

It is to be appreciated that various modifications may be made without departing from the scope of the invention as defined by the appended claims.

Having described the invention, I claim the following:

1. A dual entrance window ion chamber for measuring x-ray exposure, comprising:

a housing having a cavity therein defining an ion chamber, said housing having oppositely disposed first and second openings therein located on opposite sides of said chamber;

first and second x-ray entrance windows respectively covering said first and second openings for permitting entrance of x-rays into said chamber;

collector means located in said chamber intermediate said first and second windows for collection of electrons for use in measuring x-ray exposure;

said first and second windows being constructed differently from each other such that said first window is optimized so that said ion chamber provides a relatively flat energy response to x-rays over a first x-ray energy range and said second window is optimized so that said ion chamber provides a relatively flat energy response over a second x-ray energy range, wherein said second energy range is of a greater energy level than that of said first energy range.

2. An ion chamber as set forth in claim 1 wherein said first energy range corresponds with a mammography x-ray energy range.

3. An ion chamber as set forth in claim 2 wherein said first energy range is from about 20 kilovolts peak to about 50 kilovolts peak.

4. An ion chamber as set forth in claim, 1 wherein said second energy range is a diagnostic x-ray energy range.

5. An ion chamber as set forth in claim 1 wherein said second energy range is from about 50 kilovolts peak to about 150 kilovolts peak.

6. An ion chamber as set forth in claim 1 wherein said first energy range corresponds with a mammography x-ray energy range and wherein said second energy range is a diagnostic x-ray energy range.

7. An ion chamber as set forth in claim 6 wherein said first energy range is from about 20 kilovolts peak to about 50 kilovolts peak and wherein said second energy range is from about 50 kilovolts peak to about 150 kilovolts peak.

8. An ion chamber as set forth in claim 1 wherein said first and second windows each include a layer of plastic material.

9. An ion chamber as set forth in claim 8 wherein the interior side of each said window is covered with a layer of conductive material.

10. An ion chamber as set forth in claim 9 wherein said layer of plastic material of said first window has a thickness corresponding with that of said layer of plastic material of said second window.

11. An ion chamber as set forth in claim 10 wherein said second window has a metal patch secured to the interior surface thereof to increase the effective atomic number of the window to optimize the energy response of the ion chamber.

12. An ion chamber as set forth in claim 11 wherein said metal patch is a sheet of aluminum.

\* \* \* \* \*